United States Patent [19]

Schulman

[11] 4,139,864
[45] Feb. 13, 1979

[54] SECURITY SYSTEM FOR A SOLID STATE DEVICE

[76] Inventor: Lawrence S. Schulman, 23 Naomi St., Hiafa, Israel, 34405

[21] Appl. No.: 648,920

[22] Filed: Jan. 14, 1976

[51] Int. Cl.² .......................... H04N 5/44; G06F 1/00
[52] U.S. Cl. .................................... 358/188; 358/114; 364/709; 361/172
[58] Field of Search ............... 178/7, 3 R; 340/149 R, 340/172.5; 325/389; 317/134; 358/188, 190, 191, 114, 117; 361/172; 364/119, 709

[56] References Cited

U.S. PATENT DOCUMENTS

| 3,831,065 | 8/1974 | Martin et al. | 340/149 R |
| 3,886,307 | 5/1975 | Evans et al. | 334/7 |

OTHER PUBLICATIONS

Gernsback, "An Open Letter to the Radio Industry," Radio-Craft, p. 155, Sep. 1938.
Ellis, Science and Mechanics, vol. 36, No. 3, Mar. 1965.

Primary Examiner—John C. Martin
Attorney, Agent, or Firm—McAulay, Fields, Fisher & Goldstein

[57] ABSTRACT

The security system is adapted to be utilized in conjunction with a device such as an electronic calculator having solid state circuit elements formed on chips wherein the elements perform predetermined functions. The system comprises a gate formed on one of the chips for interconnecting at least two of the circuit elements in response to an enable signal. A data generator is provided and an encoding device encodes the data from the data generator as a sequence of binary signals. A reference encoder generates a preselected sequence of binary signals. A comparing device is connected to the encoding device and the reference encoder and is operable to generate and apply the enable signal to the gate when the sequence of signals from the encoding device matches the preselected sequence of signals from the reference encoder.

8 Claims, 3 Drawing Figures

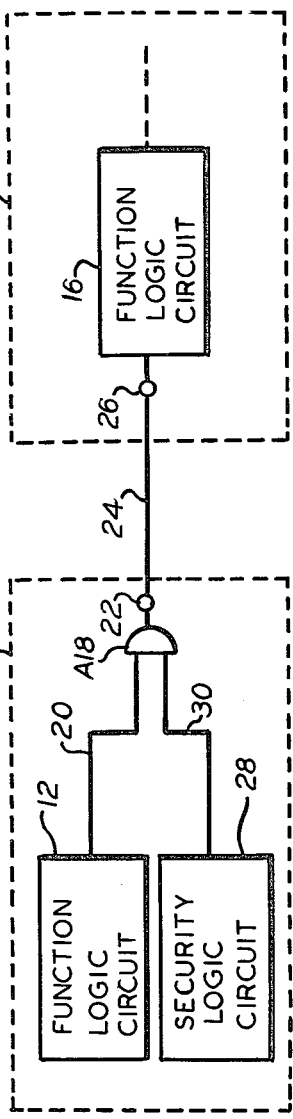
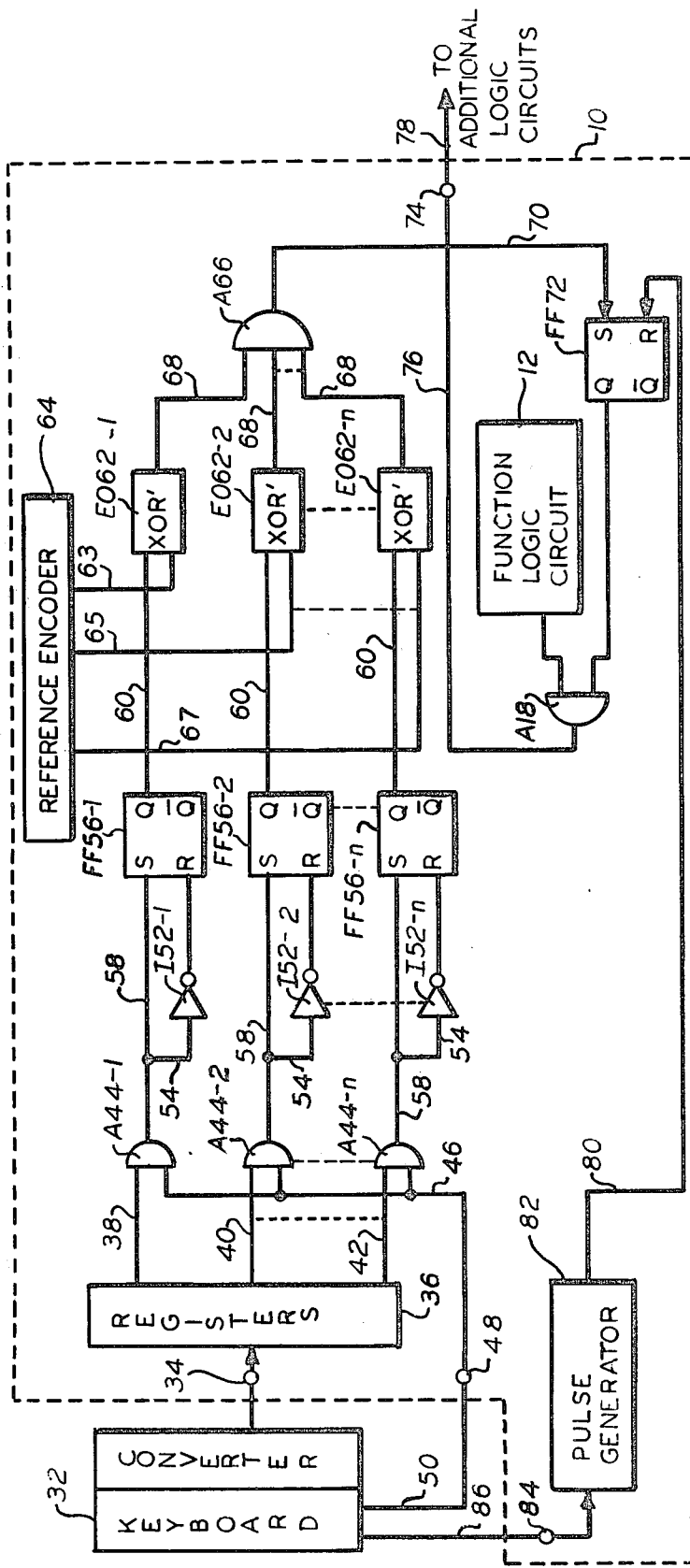

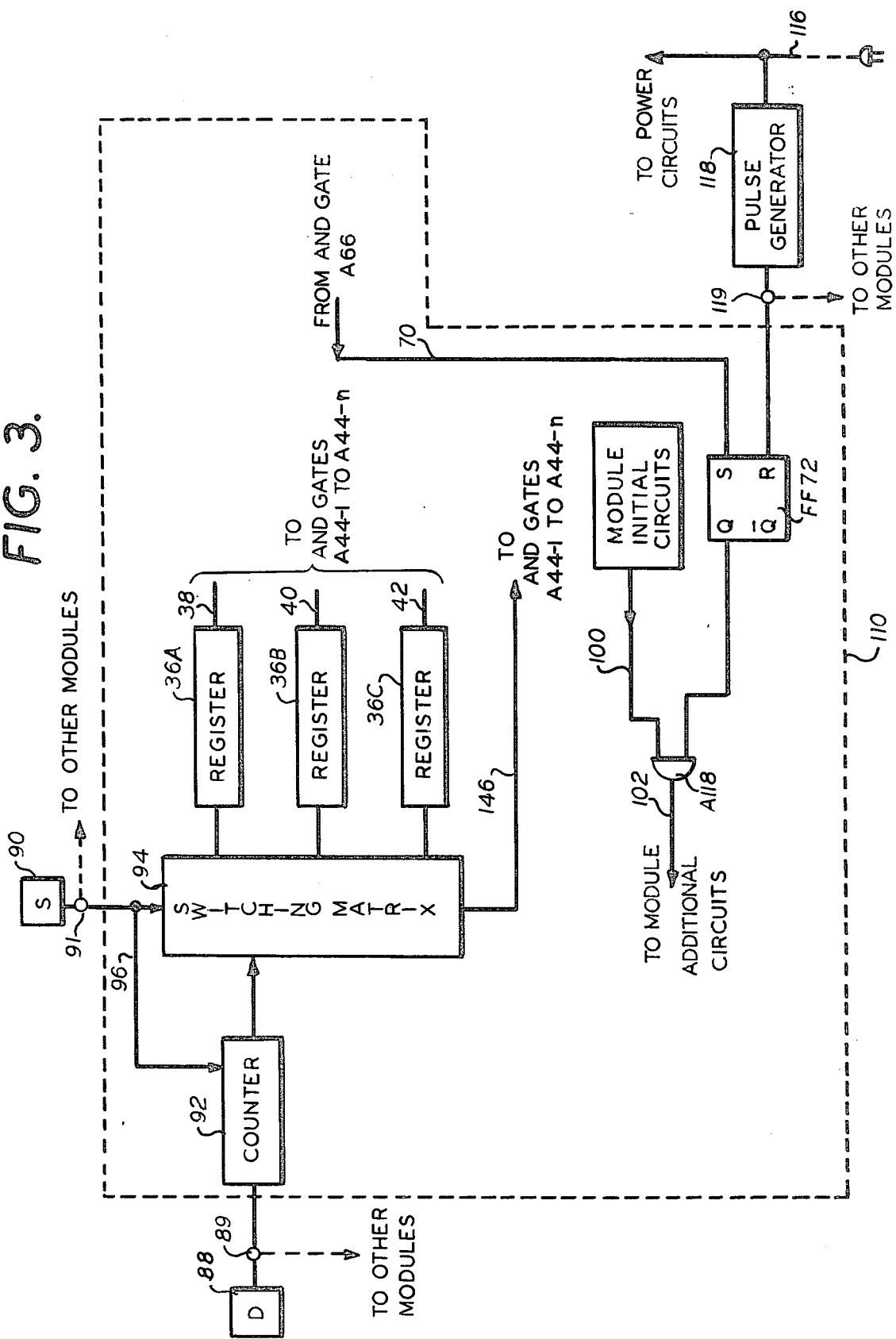

SECURITY SYSTEM FOR A SOLID STATE DEVICE

The present invention relates to a security system for a solid state device and, more particularly, relates to a security system that effectively disables the device until a predetermined code has been entered into the device.

Many solid state devices are finding widespread use simply because the use of solid state circuitry provides a compact and an extremely portable device with a high degree of accuracy. For example, sales of solid state electronic calculators of the arithmetic type and/or so-called electronic slide rules have been increasing at a geometric rate because of the versatility of such devices. However, although the compactness and portability of such devices increase their desirability, a major problem is caused by this very same attribute. To be more specific, theft of such "hand-held" electronic calculators has similarly been increasing.

Many attempts have been made to minimize this problem. However, almost all of these attempts have been directed to mechanical devices which lock or immobilize the calculator. For example, frames have been provided which are adapted to be fixedly mounted on a desk and are provided with locks to lock a calculator in place. Other solutions have been to provide bezels on electronic equipment which serve to fixedly mount the calculators on the electronic equipment similarly to the locked frames. However, these so-called solutions have many problems associated with their use. In the first place, the frames are usually expensive and they require some degree of labor to be mounted on the unit to which they are attached. Additionally, the frames eliminate one major advantage of such calculators; to wit: their portability.

Accordingly, an object of the present invention is to provide an improved solid state device.

A more specific object of this invention is to provide a solid state device that is rendered inoperable until a preselected code has been entered into the device.

A further object of the present invention is to provide a security system for such solid state devices that is reliable and efficient in operation and economical to produce.

Another object of the present invention resides in the novel circuit details that provide a security system of the type described that cannot be bypassed.

Accordingly, a security system constructed in accordance with the present invention is adapted to be utilized in conjunction with a device having solid state circuit elements formed on at least a chip wherein the circuit elements perform predetermined functions. The system comprises gating means formed on the chip for interconnecting at least two of the circuit elements in response to an enable signal. A data generator is provided and encoding means encodes the data from the data generator as a sequence of electric signals. A reference encoder generates a preselected sequence of electric signals and comparing means is connected to the encoding means and the reference encoder for generating and applying the enable signal to the gating means when the sequence of signals from the encoding means matches the preselected sequence of signals from the reference encoder. Since the gating means is formed on the same chip as at least one of the circuit elements of the associated device, it cannot be bypassed. As a result, the device will be rendered useless until the data generator is operated to produce the preselected sequence of electric signals at the encoding means.

Other features and advantages of the present invention will become more apparent from a consideration of the following detailed description, when taken in conjunction with the accompanying drawings, in which:

FIG. 1 is a circuit diagram in block form of a solid state device utilizing the security system of the present invention;

FIG. 2 is a schematic circuit logic diagram showing the security system of the present invention; and FIG. 3 is a modified embodiment of a security system constructed according to the present invention.

While the security system of the present invention has primary importance in the field of so-called hand-held solid state calculators and/or slide rules, and will be described in conjunction therewith, it should be noted that this is by way of illustration and not to be interpreted as being a limitation of the present invention. That is, the security system of the present invention may be utilized in conjunction with any solid state device. For example, use of the system of the present invention is also disclosed in conjunction with a solid state television set.

More specifically, FIG. 1 illustrates the basic connection of the security system of the present invention as used in conjunction with a solid state calculator. As is conventional, such solid state calculators are provided with a keyboard having decimal digit and function keys whereby operation of a digit key will cause the decimal digit to be registered in the calculator as a plurality of binary signals. On the other hand, operation of a function key will cause a function, such as addition, subtraction, etc., to be performed on the data entered into the calculator. Such solid state calculators comprise a plurality of chips, each one of which contains a number of circuit elements such as transistors, registers, comparators, amplifiers, etc., which are connected to form function logic circuits and in which the function logic circuits are connected together so that the overall function of the calculator may be performed on the data entered therein.

Thus, FIG. 1 diagrammaticaly illustrates a chip 10 having a function logic circuit 12 formed thereon. Additionally, a chip 14 is provided having the function logic circuit 16 formed thereon. As an example, the function logic circuit 16 may control the display of the calculator so that the display will remain blank until an appropriate signal is introduced into the function logic circuit 16. The security system of the present invention comprises an AND gate A18 having one input terminal connected to the function logic circuit 12 by a lead 20. The output terminal of the gate A18 is connected to an output terminal 22 on the chip 10. The output terminal on the chip 10 is connected by a lead 24 to an input terminal 26 on the chip 14 which, in turn, is connected to the function logic circuit 16. Accordingly, signals from the circuit 12 are prevented from reaching the circuit 16 until the gate A18 is enabled.

Also provided on the chip 10 is a security logic circuit 28, the output of which is connected to another input terminal of the gate A18 by a lead 30 and which produces an enabling signal for the gate A18 when a preselected code has been entered into the security logic circuit.

It is emphasized that the security system of the present invention comprising the security logic circuit 28 and the gate A18 are formed on the same chip as is the function logic circuit 12. Accordingly, it will be impossible to bypass the security system of the present invention. In other words, as is conventional, the circuit elements are formed on a chip by etching away various portions of the chip so that the material remaining deposited thereon forms the various circuit elements. That is, there is no "hard wiring" between the circuit elements. As a result, it is impossible to defeat the security system of the present invention by bypassing the circuit elements comprising the security system.

FIG. 2 illustrates the security system of the present invention in greater detail. More specifically, as noted above, the electronic calculators are provided with a keyboard 32 having a plurality of decimal digits and function keys thereon. Depression of any one of the keys causes a converter associated with the keyboard keys to convert the operated key into a series of binary signals representative of the operated key. The output of the keyboard/converter 32 is connected to an input terminal 34 on the chip 10 which, in turn, is connected to registers 36 comprising a plurality of individual registers for registering the binary signals for a sequence of keys that may be depressed. In the present invention, it will be assumed that a three-digit code must be entered into the keyboard in order to connect the function logic circuit 12 with the addtional function logic circuits in the calculator. However, in practice, more or less than the three digit code may be utilized depending upon the desired degree of security.

One output terminal of each of the registers in registers 36 is connected to a channel via a respective one of the output leads 38, 40 and 42. In general more than three leads will be necessary to carry the binary signal for three decimal digits, but for convenience we have drawn only three leads. Each of the channels is identical in construction and, accordingly, only one channel will be described in detail, it being understood that the remaining channels function in the same manner. Moreover, each channel will be designated by a numerical suffix designating that specific channel. For example, the upper-most channel includes an AND gate A44-1 having an input terminal connected to the lead 38, whereas the second channel includes an AND gate A44-2 having an input terminal connected to the lead 40, and the remaining channel includes an AND gate A44-n having an input terminal connected to the lead 42. The other input terminals of the AND gates A44-1 through A44-n are connected together by a lead 46 and to an input terminal 48 on the chip 10. Also connected to the terminal 48 by a lead 50 is the output of a function key on the keyboard 32 such as the "+" function key, so that depression of the "+" function key on the keyboard will apply a signal to the lead 46.

The output terminal of the AND gate A44-1 is connected by a lead 54 to the input terminal of an inverting amplifier I52-1, the output terminal of which is connected to the reset terminal "R" of a flip-flop or bistable device FF56-1. The set terminal "S" of flip-flop FF56-1 is connected by a lead 58 to the lead 54.

The "Q" output terminal of flip-flop FF56-1 is connected by a lead 60 to one input terminal of an exclusive-or gate EO62-1. The other input terminals of the exclusive-or gate EO62-1 through EO62-3 are connected to the respective output terminals of a reference encoder 64. The reference encoder 64 is a read only store having preset binary signals at the output terminals thereof which form a predetermined sequence of signals. The exclusive-or gates are operable to produce an operate signal at their respective output terminals when the signals at their input terminals match. That is, using the conventional notation of a "high" or a "low" signal to designate the condition of a binary signal, the output signal of the exclusive-or gates will be high if both input signals are high or if both input signals are low.

The output terminals of the exclusive-or gates are connected to the respective input terminals of an AND gate A66 by respective leads 68. The output terminal of the gate A66 is connected by a lead 70 to the set terminal "S" of a flip-flop FF72. The "Q" output terminal of the flip-flop FF72 is connected to an input terminal of the gate A18, the other input terminal of which is connected to the function logic circuit 12. The output terminals of the gate A18 are connected to a terminal 74 on the chip 10 by a lead 76. The terminal 74 is connected to the additional logic circuits by a lead 78.

The reset terminal "R" of the flip-flop FF72 is connected by a lead 80 to the output terminals of a pulse generator 82, the input terminals of which are connected to a terminal 84 on the chip 10. The terminal 84 is connected by a lead 86 to the keyboard 32 and may be connected to the on/off switch on the keyboard so that operation of the on/off switch to energize the calculator will similarly energize the pulse generator 82 to cause a pulse to be applied to the reset terminal "R" of the flip-flop FF72 via the pulse generator 82.

The circuit elements thus far disclosed are conventional in construction. That is, the AND gates will produce a high output signal if both input signals are high. Additionally, a high signal applied to the set terminal "S" of the bistable multivibrator or flip-flop will cause a high signal to appear at the "Q" terminal and a low signal to appear at the "$\overline{Q}$" terminal. On the other hand, if the flip-flop is in the set state, a high signal applied to the reset terminal "R" will cause the flip-flop to change states so that a low signal appears at the "Q" terminal and a high signal appears at the "$\overline{Q}$" terminal.

The sequence of binary signals at the output terminals of the encoder 64 will determine the necessary digit code to be introduced into the security system from the keyboard in order to connect function logic circuit 12 to the additional logic circuits to enable the calculator. That is, no signal will appear at the output terminals of the gate A66 unless all of the signals on the leads 68 are high. Therefore, the signals produced by the respective flip-flops FF56-1 through FF56-n must be equal to the signal on the associated one of the leads 63, 65 and 67 which is associated with the respective one of the exclusive-or gates EO62-1 through EO62-n. Assuming, for purposes of illustration, that the signals on the leads 63, 65 and 67 are respectively low, high and high, then the output signals from the flip-flops FF56-1 through FF56-n must also be low, high and high respectively. Likewise, the signals on the leads 38, 40 and 42 must also be low, high and high respectively. Therefore, the leads 38-42 are connected to the output terminals of the respective registers which will produce low, high and high signals on these leads when the desired three digit code is punched out on the keyboard 32 and entered into the registers 36 as the corresponding binary signals.

In utilizing the calculator, the operator is advised of the three digit code necessary to enable the calculator. When the power is turned on, the flip-flop FF72 is reset thereby disabling the gate A18 and effectively disconnecting the function logic circuit 12 from the additional logic circuits. Assuming that the additional logic circuits control the display, no display will be visible until the three digit code is entered into the calculator. The operator then punches out the requisite three digit code on the keyboard 32 thereby loading the registers 36 with the corresponding binary signals via the converter. Assuming the correct code has been introduced, the signals on the leads 38-42 will be low, high and high respectively. Thereafter, the operator depresses or operates the "+" function key thereby producing a high signal on the lead 46. A high signal will appear at the output terminals of the gates A44-2 and A44-n since both input terminals are high. However, since the signal on the lead 38 is low, the output signal from the gate A44-1 will similarly be low.

The high signals at the outputs of the gates A44-2 and A44-n will pass through to the set terminals "S" of the flip-flops FF56-1 and FF56-n to set the flip-flops thereby producing high signals on the leads 60 associated with these flip-flops. On the other hand, the low signal at the output of the gate A44-1 will be inverted by the amplifier I52-1, thereby resetting flip-flop FF56-1 so that a low signal will appear on the output lead 60 associated with this flip-flop. Therefore, the signals on the leads 60 associated with the respective exclusive-or gate EO62-1 through EO62-n will match the signals on the respective leads 63, 65 and 67 so that a high signal will appear on all of the leads 68. Accordingly, a high signal will appear at the output of the gate A66 thereby setting the flip-flop FF72 which will similarly produce a high signal on the lead connected to the gate A18. Accordingly, the gate A18 will be enabled to connect the function logic circuit 12 to the additional logic circuits.

If a code other than the required code was introduced into the registers 36, there will be a mismatch between the signals on at least one of the leads 60 and the signals on the leads from the reference encoder 64. Thus, the signal on one of the leads 68 will be low so that a correspondingly low signal will be produced on the lead 70. Accordingly, the flip-flop 72 will remain in the reset state thereby causing the gate A18 to remain disabled.

Accordingly, a security system has been disclosed for protecting, in particular, electronic calculators and the like wherein the system is efficient and reliable in operation and cannot be bypassed.

Although the above system has been disclosed in conjunction with a solid state electronic calculator of the type incorporating a keyboard for its operation, the invention is not necessarily limited thereto. For example, FIG. 3 illustrates a schematic circuit wiring diagram, partially in block form, of a security system that may be used in conjunction with a solid state television set. More specifically, the circuit of FIG. 3 is similar to the circuit of FIG. 2 insofar as a comparison of the signals from the flip-flops FF56-1 through FF56-n and the signals from the reference encoder 64 are concerned. Accordingly, only the differences between the circuits of FIG. 2 and FIG. 3 will be described.

As is conventional in solid state television sets, the circuits are subdivided into modules that are fabricated on different printed circuit boards. Each module controls a different function of the set. For example, one module may control the sound/sync operation (which demodulates the incoming signal and produces the audio portion of the television program and also produces the synchronizing signal) while another module may control the color, and a third module may control the vertical oscillator, etc. In the preferred embodiment, each circuit module is provided with its own security logic circuit.

To be more specific, the television set may be provided with a "D" pushbutton device 88 and an "S" pushbutton device 90, which are adapted to produce pulses at their respective outputs when the pushbuttons are depressed and released. The device 88 is connected to a terminal 89 which, in turn is connected to the security logic portion of the modules. For example, chip 110 of FIG. 3 may form a portion of the sound/sync module of the television set. Similarly to the chip 10, the chip 110 includes portions of the module logic circuits as well as the security logic circuits to prevent bypassing of the security functions.

The device 90 is connected to a terminal 91 which, in turn, is likewise connected to the security logic portion of other modules. More specifically, the terminal 89 is connected to a counter 92 and operation of the pushbutton 88 causes pulses to be applied to the counter 92, the output of which is applied to one of the registers 36A, 36B, or 36C (which comprise the registers 36), through a switching matrix 94. That is, the pushbutton D is depressed a number of times corresponding to the first digit in the three digit code. The counter 92 produces signals in binary form representative of the decimal digit. The terminal 91 is connected to counter 92 and matrix 94. After the pushbutton 88 has been operated the required number of times, the pushbutton 90 is then operated to cause the count stored in the counter 92 to be applied to the register 36A through the switching matrix 94. Additionally, the pushbutton 90 is connected to the counter through a lead 96 which resets the counter to zero. Thereafter, the pushbutton 88 is again operated for the desired number of times corresponding to the second digit in the three digit code. The pushbutton 90 is again operated to cause the output of the counter 92 to be connected to the register 36B through the switching matrix 94. Again, the counter is reset to zero via the signal on the lead 96. This operation is repeated until the register 36C stores the last digit of the three digit code in binary form. The output signals from the registers are connected to AND gates A44-1 through A44-n (as in FIG. 2, we draw three leads for convenience only.) via the leads 38-42 in the same manner as in the circuit of FIG. 2. Thereafter, the button 90 is again operated which causes a high signal to be produced on the lead 146 which is connected to the AND gates in the same manner as the lead 46 in FIG. 2, thereby applying the signals to the flip-flops FF56-1 through FF56-n in the manner noted above.

The "Q" output terminal of the flip-flop FF72 is connected to one input terminal of the AND gate A118. The initial circuits 112 of the module are also connected to an input terminal of gate A118 by a lead 100. The output terminals of the gate A118 are connected to the module remaining circuits by a lead 102. In other words, the gate A118 is serially connected in the module circuit chain such that the module will remain inoperable unless the "Q" signal from flip-flop FF72 is high. As an example, the gate A118 may control the bias for a particular stage whereby the stage will be in "cut-off" in the absence of the correct code.

The power cord 116 of the television set is connected to a pulse generator 118. The output terminals of the pulse generator 118 are connected to a terminal 119 which, in turn, is connected to the reset terminal "R" of the flip-flop FF72 in the respective security logic portions of all the modules. In operation, when the power cord 116 is inserted into a house outlet, the pulse generator 118 produces a pulse at the reset terminals "R" of the flip-flops FF72 on each secured chip to reset the flip-flops so that the "Q" terminal goes low. Accordingly, the modules will be inoperable. When the appropriate code has been entered into the television set, a signal will appear on the leads 70 which will cause the flip-flops FF72 to be set, thereby producing a high signal at the "Q" output terminal. Accordingly, the AND gates A118 will be enabled thereby permitting the circuit modules to operate properly. However, if the incorrect code has been entered into the system, the signal on the leads 70 will remain low and the television set will remain inoperative.

If one of the circuit modules must be replaced, the replacement module need not contain any security logic. This arrangement permits ease of replacement while the remaining modules, which still contain security logic circuits, provide the necessary security for the television set.

While preferred embodiments of the present invention have been shown and described herein it will become obvious that numerous omissions, changes and additions may be made in such embodiments without departing from the spirit and scope of the present invention. For example, in the circuit of FIG. 3, a separate mechanical or rechargeable battery powered counter may be inserted between the on/off switch and the pulse generator 118 (rather than connecting the generator directly to the line 116) so that the flip-flop FF72 is reset only after a preselected number of on/off operations of the television set have been accumulated, thereby eliminating the necessity to supply power when the television set is not in operation.

What is claimed is:

1. A security system for a device having solid state circuit elements formed on at least a chip wherein said circuit elements perform predetermined functions, said system comprising:
    (a) gating means formed on said chip for interconnecting at least two of said circuit elements in response to an enable signal;
    (b) a data generator;
    (c) encoding means for encoding said data from said data generator as a sequence of electric signals;
    (d) a reference encoder for generating a preselected sequence of electric signals;
    (e) and comparing means connected to said encoding means and said reference encoder for generating and applying said enable signal to said gating means when the sequence of signals from said encoding means matches said preselected sequence of signals from said reference encoder;
said chip having said encoding means, said reference encoder and said comparing means formed thereon; said data generator comprising a switch operable to represent a decimal digit, and converting means for converting the operation of said switch into binary signals representative of said decimal digit; said encoding means comprising a plurality of channels; each of said channels comprising a register for registering the decimal digit produced by said switch operation as binary coded decimal signals; and a bistable device connected to said register and movable from a first to a second state in response to a predetermined signal produced by said register.

2. A security system as in claim 1, in which said device comprises an electronic calculator having a keyboard having decimal digit and function keys connected to said converting means and said encoding means further comprises a first gate connected between said register and said bistable device for applying the signal produced by said register to said bistable device in response to an operate signal, and operate signal generating means responsive to the operation of a function key for applying said operate signal to said first gate.

3. A security system as in claim 1, in which said reference encoder comprises a read only store having a plurality of output terminals each one of which has a binary signal applied thereto to produce said sequence of signals, said comparing means comprising a second gate in each of said channels having one input terminal connected to the associated bistable device and another input terminal connected to a respective one of said read only store output terminals, said second gate being operable to produce an output signal at an output terminal when the signals at the input terminals are equal to each other, and a third gate having a plurality of input terminals connected to the output terminal of said respective second gates and responsive to said output signal simultaneously appearing at each one of said plurality of input terminals to produce said enable signal.

4. A security system as in claim 3, in which said gating means comprises a bistable device connected to said third gate and movable from a first to a second state in response to said enable signal, a fourth gate responsive to the second state of said bistable device for connecting together said two circuit elements, and reset means responsive to the energization of said device for moving said bistable device from said second to said first state.

5. A security system as in claim 4, in which said device comprises a television set having a plurality of circuit modules, and said gating means comprises a plurality of fourth gates each associated with a different circuit module for energizing the associated module in response to the second state of said bistable device.

6. In a solid state electronic calculator of the type having a keyboard having digit and function keys operable to enter data in the form of binary signals into said calculator, and solid state circuit elements formed on a plurality of chips for registering data and performing predetermined functions on said data; a security system for enabling said calculator in response to the operation of a preselected sequence of keys, said security system comprising circuit elements formed on one of said chips containing said calculator circuit elements, said security system circuit elements comprising: gating means interconnecting said calculator circuit elements formed on said one chip with another of said calculator circuit elements in response to an enable signal, encoding means for encoding the binary signals representative of the operation of said preselected sequence of keys as a first set of a plurality of coded binary signals, a reference encoder for generating a second set of a plurality of coded binary signals having the same sequence as said first set, and comparing means connected to said encoding means and said reference encoder for generating and applying said enable signal to said gating means when said first and second set of signals are equal, the operated keys comprising said preselected sequence comprising digit keys, said encoding means comprising a plurality of channels, each of said channels comprising a register for registering the binary signals representative of the operated decimal digit key, and bistable device connected to said register and movable from a first to a second state in response to a predetermined binary signal produced by said register, a first gate connected between said register and said bistable device for applying the signal produced by said register to said bistable device in response to an operate signal, and operate signal generating means responsive to the operation of a function key for applying said operate signal to said first gate.

7. An electronic calculator as in claim 6, in which said reference encoder comprises a read only store having a plurality of output terminals, each of which has a binary signal applied thereto to produce said second set of signal, said comparing means comprising a second gate in each of said channels having one input terminal connected to the associated bistable device and another input terminal connected to a respective one of said read only store output terminals, said second gate being operable to produce an output signal at an output terminal when the signals at the input terminals are equal to each other, and a third gate having a plurality of input terminals connected to the output terminal of said respective second gates and responsive to said output signals simultaneously appearing at each one of said plurality of input terminals to produce said enable signal.

8. An electrode calculator as in claim 7, in which said gating means comprises a bistable device connected to said third gate and movable from a first to a second state in response to said enable signal, a fourth gate responsive to the second state of said bistable device for connecting together said calculator circuit elements, and reset means responsive to the energization of said calculator for moving said bistable device from said second to said first state.

* * * * *